(12) United States Patent
Fry

(10) Patent No.: US 11,554,497 B2
(45) Date of Patent: Jan. 17, 2023

(54) ARTICULATED ROBOTIC ARMS FOR ROBOTIC BAGGAGE INSPECTION AND SWABBING

(71) Applicant: The Government of the United States of America, as represented by the Secretary of Homeland Security, Washington, DC (US)

(72) Inventor: Mark A. Fry, Marco Island, FL (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/884,318

(22) Filed: Aug. 9, 2022

(65) Prior Publication Data
US 2022/0379486 A1    Dec. 1, 2022

Related U.S. Application Data

(63) Continuation of application No. 17/590,456, filed on Feb. 1, 2022, now Pat. No. 11,420,336, which is a
(Continued)

(51) Int. Cl.
*B25J 9/00*    (2006.01)
*B25J 9/16*    (2006.01)
(Continued)

(52) U.S. Cl.
CPC ............. *B25J 9/1697* (2013.01); *B25J 9/043* (2013.01); *B25J 9/1612* (2013.01); *B25J 13/087* (2013.01); *B25J 19/023* (2013.01); *B25J 19/027* (2013.01)

(58) Field of Classification Search
CPC ........ B25J 9/1697; B25J 9/043; B25J 9/1612; B25J 13/087; B25J 19/023; B25J 19/027
See application file for complete search history.

(56) References Cited

U.S. PATENT DOCUMENTS 11,199,853 B1 * 12/2021 Afrouzi ................ G05D 1/0246
2012/0035759 A1    2/2012 Rodriguez Cuesta
(Continued)

*Primary Examiner* — Ian Jen
(74) *Attorney, Agent, or Firm* — Lavanya Ratnam; Robert W. Busby; Kelly G. Hyndman

(57) ABSTRACT

Systems and methods are described, and an example system includes a transport bin configured to carry a baggage item and having spatial reference frame marking detectable by electromagnetic scan and by machine vision. The system includes a robotic arm apparatus at an inspection area, and includes a switched path baggage conveyor that, responsive to electromagnetic scan detection of an object-of-interest (OOI) within the baggage item, conveys the transport bin to the inspection area. The electromagnetic scan generates OOI geometric position information indicating geometric position of the OOI relative to the spatial reference frame marking. The robotic arm apparatus, responsive to receiving the transport bin, uses machine vision to detect orientation of the spatial reference frame marking, then translates OOI geometric position information to local reference frame, for robotic opening of the baggage item, and robotic accessing and contact swab testing on the OOI.

20 Claims, 8 Drawing Sheets

Related U.S. Application Data continuation of application No. 17/372,050, filed on Jul. 9, 2021, now Pat. No. 11,254,011.

(60) Provisional application No. 63/139,204, filed on Jan. 19, 2021.

(51) Int. Cl.
  *B25J 9/04* (2006.01)
  *B25J 19/02* (2006.01)
  *B25J 13/08* (2006.01)

(56) References Cited

U.S. PATENT DOCUMENTS

2018/0104815 A1* 4/2018 Yang ..................... B25J 9/162
2021/0282581 A1   9/2021 Odeh

* cited by examiner

ARTICULATED ROBOTIC ARMS FOR ROBOTIC BAGGAGE INSPECTION AND SWABBING

CROSS-REFERENCE TO RELATED APPLICATIONS

This application is a continuation of U.S. non-provisional patent application Ser. No. 17/590,456, filed Feb. 1, 2022, entitled "Robotic Resolution of Scanning Alarms," which is a continuation of U.S. non-provisional patent application Ser. No. 17/372,050, filed Jul. 9, 2021, entitled "System and Method for Robotic Resolution of Scan Alarm," which is a non-provisional that claims the benefit of priority to U.S. Provisional Patent Application No. 63/139,204, filed Jan. 19, 2021, entitled "System and Method for Robotic Resolution of Scan Alarm," the disclosures of all of which are hereby incorporated by reference in their entireties.

STATEMENT OF GOVERNMENT INTEREST

The present invention was made by employees of the United States Department of Homeland Security in the performance of their official duties. The U.S. Government has certain rights in this invention.

FIELD

Embodiments disclosed herein generally relate to electromagnetic screening and inspection.

BACKGROUND

For public safety, security procedures at airports include screening of check-in baggage for weapons, explosives, and other prohibited items. When the scanning detects in a baggage item one or more objects that may be or pertain to explosives or other hazardous materials, security specialists, such as Bomb Appraisal Officers (BAOs) are notified and take steps to handle the safety issue. Certain tasks in the handling can impose schedule and availability burdens on BAOs.

SUMMARY

For a system, an example implementation can include a system for robotic arm resolution of baggage scanning alarm generated by electromagnetic scanner, and can include a transport bin, which can be configured for carrying a baggage item, and can include a spatial reference frame marking that can be detectable by electromagnetic scanning and by machine vision. The example implementation can include robotic baggage item opening and inspection apparatus, which can be configured to apply, responsive to receiving the transport bin in combination with an OOI geometric position information indicative of a geometric position of the OOI relative to the spatial reference frame marking, a robotic opening operation to the baggage item. The robotic baggage item opening and inspection apparatus, can be configured to perform, in response to a positive result of the robotic opening operation, a robotic accessing and swabbing operation directed to the OOI, which can be based at least in part on a combination of the OOI geometric position information and a machine vision detection of the spatial reference frame marking.

For a method, an example implementation can include a method for receiving from an electromagnetic scanning a transport bin and an object-of-interest (OOI) geometric position information, the transport bin carrying a baggage item and including a machine readable marking of a spatial reference frame, the OOI geometric position information indicating a detected geometric position, by the electromagnetic scanning, of the OOI in reference to the machine readable marking of the spatial reference frame. The example implementation can include, in response to the receiving: machine vision detecting of the spatial reference frame marking, resolving the spatial reference frame marking into a local spatial reference frame, the local spatial reference frame being local to the robotic accessing and swabbing operation, and translating the OOI geometric position information to a local OOI geometric position map, based at least in part on a result of the resolving. The example implementation can further include applying a robotic opening operation to the baggage item, and upon a positive result of the robotic opening operation: performing a robotic accessing and swabbing operation directed to the OOI, based at least in part on the local OOI geometric position map.

DETAILED DESCRIPTION

Figure 1:
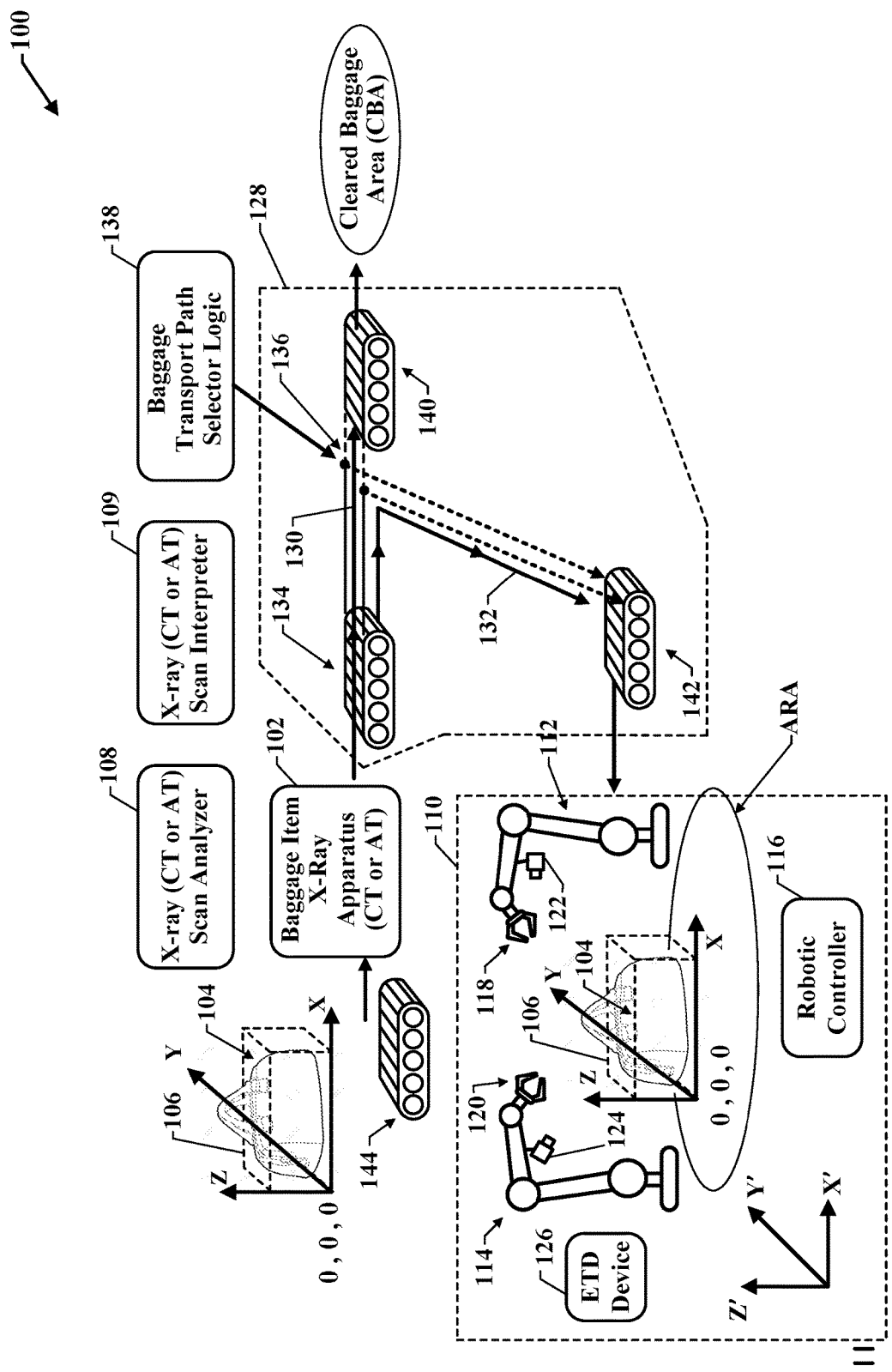
FIG. 1 shows a block diagram of one example of a system for robotic resolution of baggage scanning alarm in accordance with various embodiments.

In the drawings, like reference numerals designate identical or corresponding parts throughout the several views. The drawings are generally not drawn to scale unless specified otherwise or illustrating schematic structures or flowcharts. As used herein, the words "a," "an" and the like generally carry a meaning of "one or more," unless stated otherwise.

Description includes references to airport facilities and operations, as airports are an example environment in which embodiments according to this disclosure can be practiced. This is not intended as any limitation as to applications or environments in which embodiments in accordance with this disclosure can be practiced.

One embodiment of a robotic alarm resolution system can include a robotic baggage access and content sampling apparatus configured to receive, through an alarm-switched baggage conveyor, alarm-generating X-ray scanned baggage items from an X-ray baggage content scanner. In an aspect. alarm-generating X-ray scanned baggage items can be baggage items that the X-ray baggage content scanner detected as having objects exhibiting X-ray absorption characteristics of one or more explosives, or explosive-related materials or substances, or other materials of interest. Such objects will be referenced, for purposes of description, as "objects-of-interest," which will be interchangeably recited as "OOI." For purposes of description, the alarm-generating X-ray scanned baggage items will be alternatively referenced as "suspect baggage items."

According to various embodiments. the robotic baggage access and content sampling apparatus can be configured receive, in association with each suspect baggage item, an OOI map, indicating the geometric position of OOIs detected in the suspect baggage item. The OOI map can be generated, for example, by an X-ray scan analyzer associated with the X-ray baggage content scanner.

The robotic baggage access and content sampling apparatus can include one or more articulated robotic arms, which can be communicatively connected to a robotic controller. The one or more articulated robotic arms can be arranged to operate in a robotic inspection area, which may be a particularly constructed, not publicly accessible area. The robotic alarm resolution system can be configured to apply, through the one or more articulated robotic arms, a robotic alarm resolution process to received suspect baggage items. The robotic alarm resolution process can include robotic opening, e.g., unzipping the baggage item, swiping one or more OOIs, and inserting the swab to an explosive trace detection (ETD) system.

The alarm-switched baggage conveyor can be configured to switch, dependent on whether the baggage content scan analyzer generates the alarm, between conveying the baggage item on a first, or non-alarm baggage transport path and or on a second, or alarm resolution baggage transport path. The alarm resolution baggage transport path can deliver the baggage item to the robotic inspection area. The non-alarm baggage transport path can deliver the baggage item to a designated area, e.g., for traveler pick-up or loading onto an airplane. For purposes of description, the designated area can be referenced as a "cleared baggage pick-up area."

In an embodiment, baggage items can be X-ray scanned and switchably transported to one of the cleared baggage pick-up area and the robotic inspection area within particularly configured baggage transport bins. In one or more embodiments, the particularly configured baggage transport bins can include machine vision detectable reference axis markings. For purposes of description, the recitation "particularly configured baggage transport bins" will be alternatively recited with the abbreviated form "PCF baggage transport bins." In an embodiment, the scan analyzer can be configured to generate OOI maps with geometric positions, e.g., 2D or 3D positions, of the OOIs defined in terms of the reference axes of the PCF baggage transport bins. In embodiments, the robotic baggage access and content sampling apparatus can be configured with a local spatial reference frame of local reference axes, and "local" can be local to the robotic baggage access and content sampling apparatus. In various embodiments, the robotic baggage access and content sampling apparatus can be further configured to machine vision read the machine vision detectable reference axis markings of the PCF baggage transport bins. The robotic baggage access and content sampling apparatus can be configured to determine, associated with the machine vision reading, an orientation of the machine vision detectable reference axis markings in relation to the local reference axes. In various embodiments, the robotic baggage access and content sampling apparatus can be further configured to translate the received OOI map, upon reading and determining the orientation of the machine vision detectable reference axis markings, to the local spatial reference frame. For purposes of description, a result of the translation will be referred to as a "translated OOI map." It will be understood that the recitation "translated OOI map" as used herein has no intrinsic meaning; the recitation is a reference to the OOI geometric position information carried by the received OOI, translated to the local reference axes. Novel features including, for example, the transport bin's reference axis markings, readable by X-ray scan and by machine vision, X-ray scanning generation of the OOI map referencing the, combined with machine vision reading and corresponding determining of the orientation of the transport bin's reference axis markings, and associated translation of the OOI map to the translated OOI map, can provide various further technical benefits. Such technical benefits include, but not are limited to, substantial reduction of time wasted, and of baggage content unnecessarily shifted around, due to non-productive movement of robotic arms.

FIG. 1 shows a simplified diagram of one embodiment of a system 100 (hereinafter "system 100") for robotic resolution of scan alarms in accordance with this disclosure. The system 100 can include an X-ray scanner 102, configured to receive and scan a succession of baggage items, of which baggage item 104 visible in FIG. 1 is one example. In an aspect, baggage items 104 can be carried through the system 100 within PCF baggage transport bins according to various embodiments, such as the example PCF baggage transport bin 106. In accordance with various embodiments, the PCF baggage transport bin 106 includes machine vision detectable reference axis markings, indicative of mutually orthogonal spatial reference axes. In accordance with various embodiments, the mutually orthogonal spatial reference axe can be used, e.g., by the X-ray scanner, to define co-ordinates of the three-dimensional space within the PCF baggage transport bin 106. The reference axis markings can include a first reference axis marking, such as the example "X" reference axis marking extending parallel to an "X" axis, a second reference axis marking, such as the example "Y" reference axis marking extending parallel to an "Y" axis, which is orthogonal to the first or X reference axis, and can include a third reference axis marking, such as the example "Z" reference axis extending parallel to an "Z" axis, which is orthogonal to the first or X reference axis and orthogonal to the second or Y reference axis.

Associated with the X-ray scanner 102 can be a scan analyzer 108, which can be configured to perform image construction, e.g., conversion to scan data and to a pixel image, of X-ray energy received after passing through the baggage item, and to perform analysis on scan data output by the X-ray scanner 102. Connected to the scan analyzer 108 and, in an aspect, to the X-ray scanner 102, can be a scan interpreter 109. The scan analyzer 108 and scan interpreter 109 can be configured to generate an OOI map for baggage items 104 in which one or more OOIs is detected. In various embodiments, the OOI map can define geometric positions of the OOIs in terms of the orthogonal X, Y, and Z spatial reference axes of the PCF baggage transport bin 106. The geometric position can include a first reference axis position, a second reference axis position, and a third reference axis position, meaning the OOI geometric position along the first reference axis X, along the second reference axis Y, and along the third reference axis Z, respectively.

In various embodiments, system 100 includes a robotic baggage item opening and inspection apparatus 110, which can include a first articulated robotic arm 112 and a second articulated robotic arm 114. The system 100 can include a robotic controller 116 communicatively connected to both the first articulated robotic arm 112 and the second articulated robotic arm 114. The robotic controller 116 can connect to additional articulated robotic arms, if included. Benefits of multiple articulated robotic arms, e.g., the first articulated robotic arm 112 and second articulated robotic arm 114, include capability of respectively different structures, specialized to a degree that may be impractical for a single, multi-purpose arm. For example, the first articulated robotic arm 112 can feature a first gripper 118, with structure particularized to opening one or more types of baggage item open-close mechanisms. The second articulated robotic arm 114 can feature a second gripper 120, with a structure particularized, for example, to swabbing surfaces of OOIs. Two is not a limitation on the number of articulated robotic arms in implementations of the robotic baggage item opening and inspection apparatus 110. Also, implementations of the robotic baggage item opening and inspection apparatus 110 can include a single articulated robotic arm.

The robotic baggage item opening and inspection apparatus 110 can be configured in reference to a local reference frame, such as the example labeled X', Y', Z' The example local reference frame can include a first local reference axis, X', a second local reference axis, Y', and a third local reference axis, Z'. In various embodiments, the second local reference axis Y' can be orthogonal to the first local reference axis X', and the third local reference axis Z' can be orthogonal to the first local reference axis X' and orthogonal to the second local reference axis Y'. Translating geometric positions of OOIs from positions provided in the reference frame X, Y, Z, to the local spatial reference frame X', Y', Z' can be based at least in part on the machine vision detection, e.g., via the machine vision camera 222, of an orientation of the X, Y, Z, spatial reference frame marking relative to the X', Y', Z', local spatial reference frame.

In an embodiment, the robotic baggage item opening and inspection apparatus 110 can include one or more machine-vision cameras. FIG. 1 shows, as one configuration of machine vision cameras, a first machine vision camera 122, movably attached or mounted to the first articulated robotic arm 112, and a second machine vision camera 125, movably attached or mounted to the second articulated robotic arm 114. The movable attachments or mounts can include pivoting attachments, which can provide respective rotations about respective attachment axis, or about a plurality attachment axes. The FIG. 1 visible configuration of the first machine vision camera 122 and second machine vision camera 124 is only an example. In a further embodiment, a larger population of machine vision cameras can be included. In such an embodiment, depending on the population of the machine vision cameras, some may be fixed mounted, The robotic baggage item opening and inspection apparatus 110 can include an Explosive Trace Detection (ETD) device 126. The ETD device 126 can be, for example an Amplifying Fluorescent Polymer (AFP) device, an Ion Mobility Spectrometer (IMS), or a Surface-enhanced Raman spectroscopy (SERS) device.

The system 100 can include an alarm-switched baggage conveyor 128. According to various embodiments, the alarm-switched baggage conveyor 128 can be configured to switch, dependent on whether an OOI detection alarm is generated, e.g., by the scan analyzer 108 or scan interpreter 109, between conveying the baggage item on a first path 130, which can be a path for conveying the PCF baggage transport bin 106 when the carried baggage item 104 is not indicated by the electromagnetic scan as having OOIs in its content, and a second path 132 which can be a path for conveying the PCF baggage transport bin 106 when the carried baggage item 104 is indicated by the electromagnetic scan as having OOIs in its content. The first path 130 can be referenced, for example, as a non-alarm baggage transport path 130. The second path 132 can be referenced, for example, as an alarm resolution baggage transport path 132. In an example implementation, the second path can deliver the PCF baggage transport bin 106 and the baggage item 104, to the robotic inspection area ARA. The non-alarm baggage transport path 130 can deliver the baggage item to a cleared baggage pick-up area, such as the example labeled DBA. The cleared baggage pick-up area, e.g., CBA, can be for traveler pick-up or loading onto an airplane.

The alarm-switched baggage conveyor 128 can include a baggage first conveyor 134, which can have one end proximal to an exit from the X-ray scanner 102 and another end proximal to switchable path diverter 136. The switchable path diverter 136 can be controlled, e.g., by a baggage transport path selector logic 138, based on an OOI detection alarm output, for example, from the scan interpreter 109. The alarm-switched baggage conveyor 128 can include a baggage second conveyor 140, which can have one end proximal to the switchable path diverter 136 and another end proximal to the cleared baggage pick-up area. The alarm-switched baggage conveyor 128 can further include a baggage third conveyor 142, which can have one end proximal to the switchable path diverter 136 and another end proximal to the robotic inspection area ARA. The system 100 can further include a baggage scan input conveyor 144, feeding the X-ray scanner 102.

Figure 2:
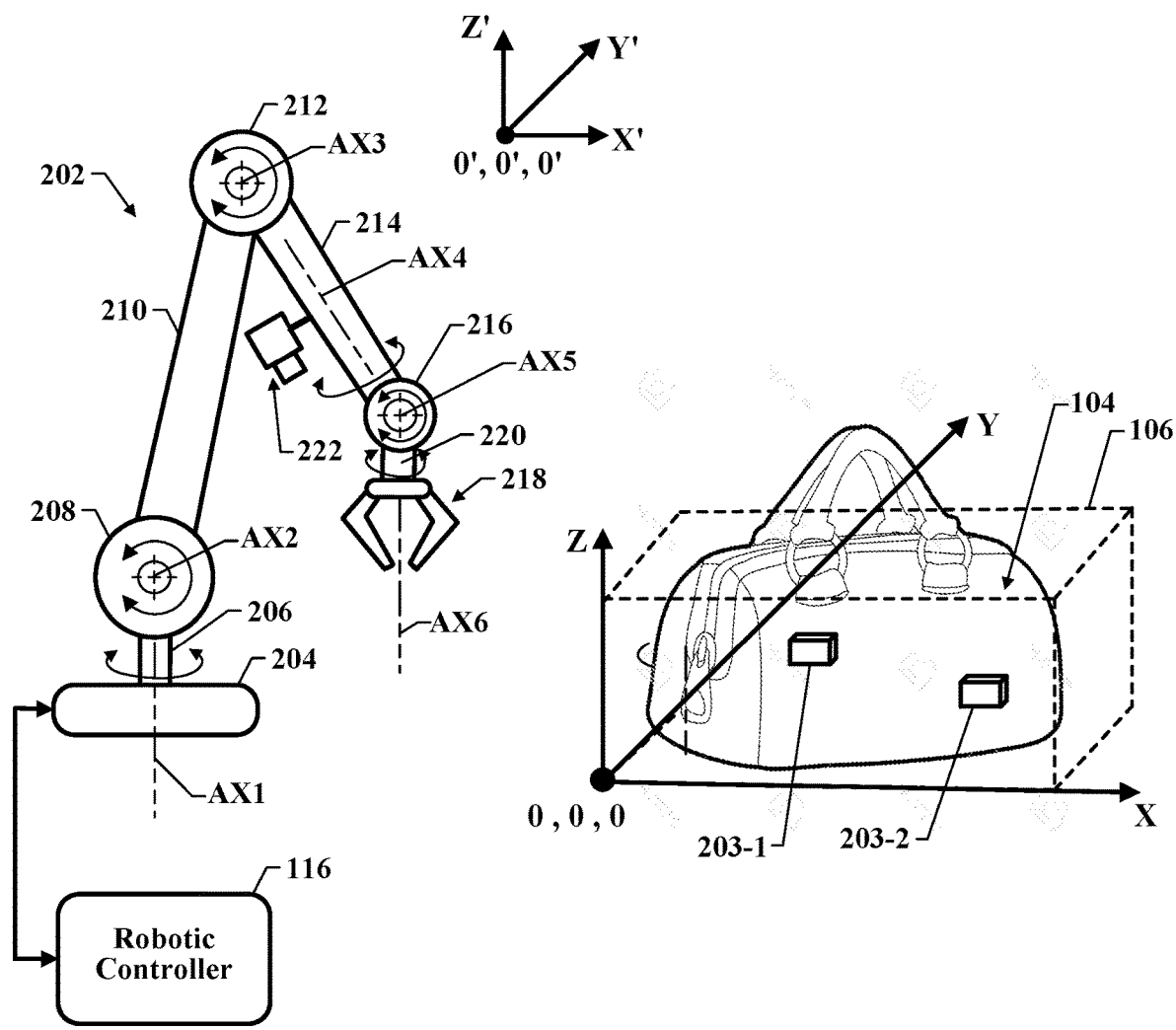
FIG. 2 illustrates example structure and related features of a robotic arm device in accordance with various embodiments, providing robotic inspection of objects-of-interest (OOI) within a content of a baggage item, using novel structure transport bin.

Respective implementations of the first articulated robotic arm 112 and of the second articulated robotic arm 114 may have structural differences from one another. For brevity, a generic 6-degree freedom-of-motion, articulated robotic arm 202 is shown by FIG. 2, connected to the robotic controller 116. Described features of articulated robotic arm 202 can be readily adapted or incorporated into respective implementations of the first articulated robotic arm 112 and of the second articulated robotic arm 114. The 6 degrees will be referenced in later description of operations performed by the first articulated robotic arm 112, e.g., opening a baggage item 104 zipper, and description of operations performed by the second articulated robotic arm 114, e.g., accessing and swabbing an OOI within a baggage item.

The articulated robotic arm 202 can include an arm base 204 that can support a first axis pivoting mount 206 configured to pivot about a first rotation axis AX1. For purposes of description the AX1 axis can be assumed normal to the X'-Y' plane of the articulated robotic arm 202 local X', Y', Z' reference frame. Mounted on the first axis pivoting mount 206 can be a second axis pivot 208, configured to pivot about a second axis AX2. The second axis AX2 can extend normal to the first axis AX1, i.e., parallel to the X'-Y' plane of the articulated robotic arm 202 local X', Y', Z' reference frame. The proximal end of an arm first member 210 can connect to the second axis pivot 208 and, at the distal end of the arm first member 210 can be a third axis AX3 pivot 212. The third axis AX3 can extend parallel to the second axis AX2. A proximal end of an arm second member 214 can connect to the third axis AX3 pivot 212 and, at a distal end of the arm second remember 214 a fourth axis AX4 rotatable pivot can attach to a fifth axis AX5 pivot 216. The fourth axis AX4 can be a longitudinal axis of the arm second member 214. A gripper 218 can connect, via sixth axis AX6 pivot 220, to the fifth axis AX5 pivot 216. A machine vision camera 222 can connect, e.g., by a pivoting mount, to the arm second member 214.

The robotic controller 116 can be configured to control the articulated robotic arm based at least in part on a translating the OOI geometric position information to a translated OOI geometric position map. The translating can be based at least in part on the machine vision detection, e.g., via the machine vision camera 223 of an orientation of the X, Y, Z, spatial reference frame marking relative to the X', Y', Z', local spatial reference frame, which is local to the robotic baggage item opening and inspection apparatus 110.

Also visible in FIG. 2 is an instance of baggage item 104 within PCF baggage transport bin 106. The PCF baggage transport bin 106 shows machine vision detectable reference axis X, Y, and Z. Within the PCF baggage transport bin 106 are two example OOIs—a first OOI 203-1 and a second OOI 203-2 (collectively referred to as "OOIs 203"). In processes according to one or more embodiments, in association with the FIG. 2 PCF baggage transport bin 106 carrying the baggage item 104 with the OOIs 203 being conveyed to the robotic inspection area, the robotic controller 116 will receive a content OOI map from the scan analyzer 108 and scan interpreter 109. The OOI map defines the respective locations of the first OOI 203-1 and second OOI 203-2 in terms of the machine-readable X, Y, and Z spatial reference axes of the PCF baggage transport bin 106. The robotic controller 116, in response, can translate the machine-readable X, Y, and Z reference axis to the local spatial reference frame X', Y', and Z', and then translate the OOI map into a translated OOI map, which defines the first OOI 203-1 and second OOI 203-2 locations as X', Y', and Z' coordinates.

The configuration of the gripper 218 is visible as a pincer gripper. It will be understood that the pincer configuration of the gripper 218 is only one example configuration. Another configuration can include, for example, an articulated robotic hand.

Figure 3A:
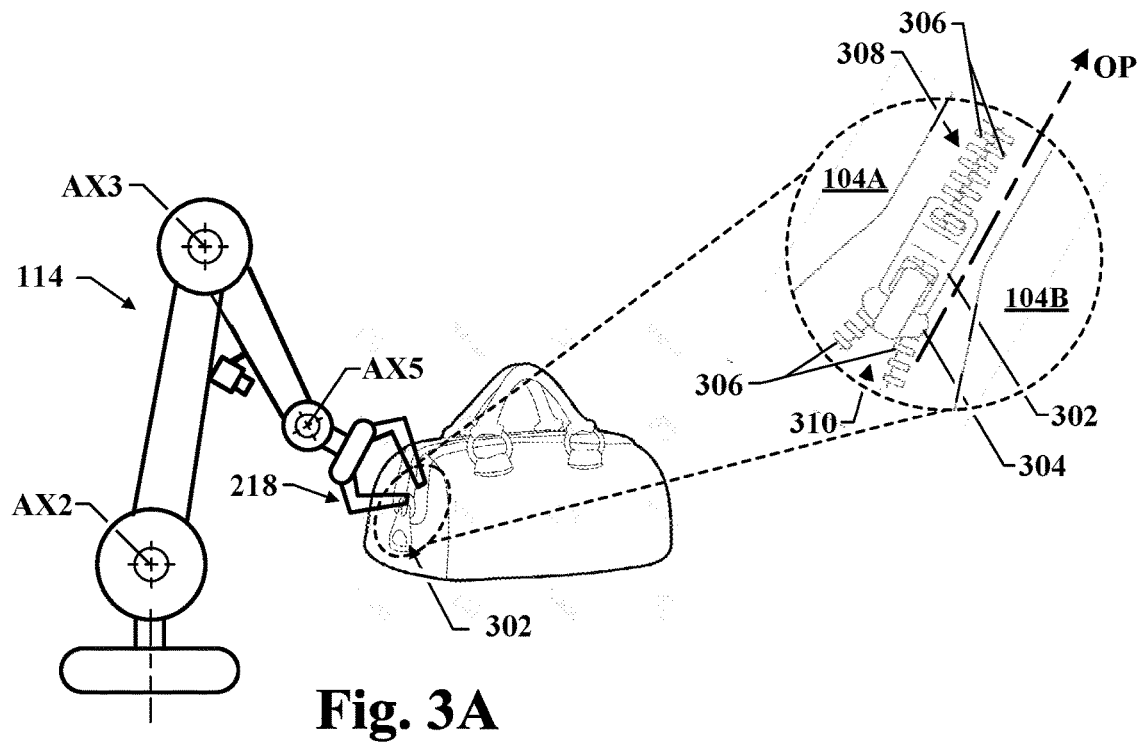
FIG. 3A shows an example robotic arm device positioning for a robotic opening of a baggage item zipper, in a process for robotic resolution of scan alarm in accordance with various disclosed embodiments.
Figure 3B:
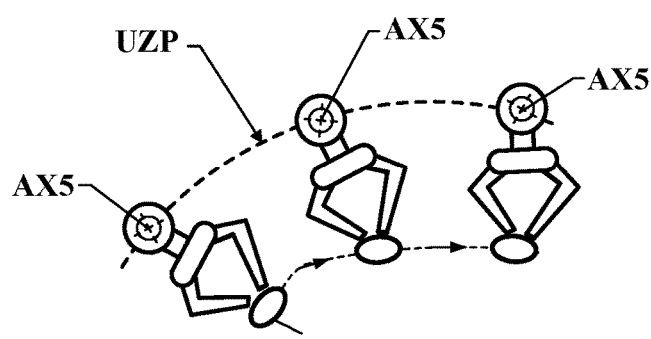
FIG. 3B is a diagram of an example movement trajectory of a robotic arm gripper and zipper pull in the robotic opening.
Figure 3C:
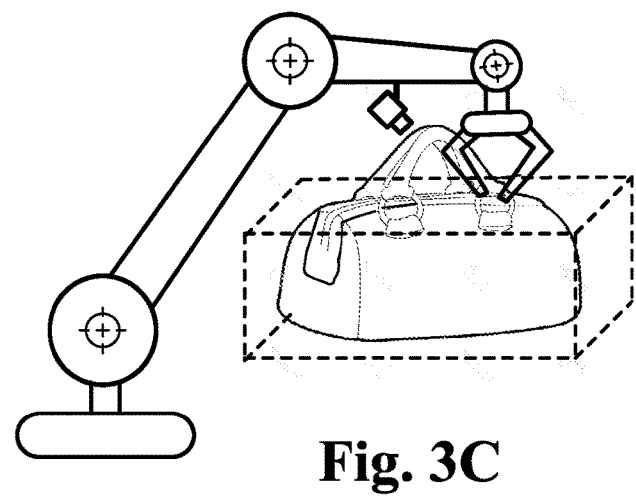
FIG. 3C shows an example movement completion position.

FIG. 3A shows a robotic arm starting position, and example axes of movement for a robotic opening of a baggage item zipper. Region A is an enlarged view of the zipper pull 302 and zipper slide 304, the zipper slide 304 engaging the zipper teeth 306 of the FIG. 3A baggage item zipper. FIG. 3B is a diagram of a translational and rotational movement of the gripper of the first gripper 118 of the first articulated robotic arm 112 opening the example baggage item zipper. FIG. 3C shows a completion position of the robotic arm, in the robotic opening of the baggage item zipper, in a process for robotic resolution of scan alarm in accordance with this disclosure.

Referring to the enlarged Region A of FIG. 3A, movement of the zipper slide 304 in the OPN direction progressively disengages the zipper teeth 306, from their respective interlocked or engaged arrangement 308 to separate into their respective open arrangement 310.

Figure 4:
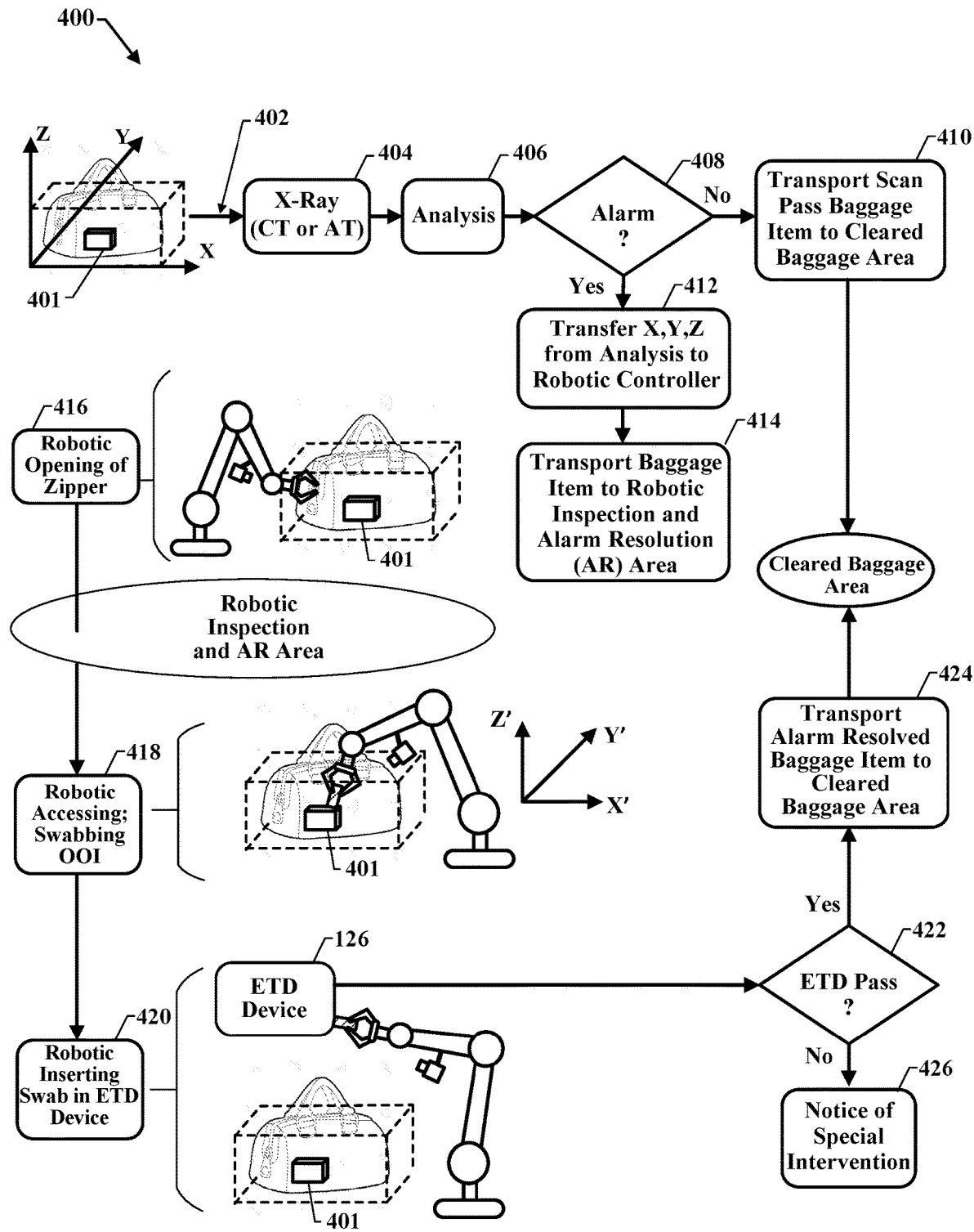
FIG. 4 shows a flow diagram of operations in an example robotic process on the FIG. 1 system, including scan alarm triggered transport of a baggage item, robotic opening the baggage item, accessing and swabbing an OOI, in accordance with various disclosed embodiments.

FIG. 4 shows a flow diagram of robotic process 400 on the FIG. 1 system, including scan alarm triggered transport of baggage item 104 within example PCF baggage transport bin 106. One example instance of the robotic process 400 will be described assuming no OOI in the baggage item 104. The instance can commence by receiving 402 and X-ray scanning 404 the baggage item 104 within PCF baggage transport bin 106. The robotic process 400 can then apply, e.g., using the FIG. 1 scan analyzer 108 and scan interpreter 109, an analysis 406 to a result of the X-ray scanning 404. Since the example baggage item 104 does not include an OOI there is no alarm and, therefore, the decision block controls the FIG. 1 alarm-switched baggage conveyor 128 to transport 410 the PCF baggage transport bin 106 and baggage item 104 to the cleared baggage pick-up area.

An instance of the robotic process 400 will now be described assuming an example OOI 401 in the baggage item 104. The receiving 402 and X-ray scanning 404 can proceed as described above, except that the analysis 406, e.g., by operations of the FIG. 1 scan analyzer 108 and scan interpreter 109, detects the presence and location of the OOI 401, and generates an alarm. The analysis 406 also generates a corresponding OOI map indicating the OOI location in terms of the X, Y, Z machine-readable spatial reference axes of the PCF baggage transport bin 106. The robotic process 400 then, as indicated by the "Yes" outflow from decision block 408, proceeds to communicate 412 the X, Y, Z OOI map to the robotic controller 116, and then to transport 414 the baggage item 104 in its PCF baggage transport bin 106 to the robotic alarm resolution inspection area. Referring to FIG. 1, operations in the transport 414 can include the baggage transport path selector logic 138 controlling the alarm-switched baggage conveyor 128 to urge the PCF baggage transport bin 106 from the output end of the baggage first conveyor 134 to an input end of the baggage third conveyor 142.

Upon the transport 414 delivering the baggage item 104 in the PCF baggage transport bin 106 to the robotic inspection area, the robotic process 400 can proceed to robotic opening 416 the zipper of the baggage item 104. Operations in the robotic opening 416 can be as described above in reference to FIGS. 3A, 3B, and 3C. Upon completing the robotic opening 416, the robotic process 400 can proceed to robotic accessing and swiping 418 a surface of the OOI with a swab. The robotic process 400 can then proceed to robotic inserting 420 the swab into an ETD device, such as the ETD device 126 shown in the FIG. 1 system 100. Operations succeeding the robotic inserting 420 of the swab into the ETD device depend on the result of ETD analysis. If the result from the ETD device is "pass," i.e., no detection of explosive trace the robotic process 400 can proceed, as indicated by the "yes" outflow of decision block 422, to transport 424 the baggage item 104 to the cleared baggage pick-up area CBA. If the result from the ETD is "not pass," i.e., an indication of explosive trace, the robotic process 400 can proceed, as indicated by the "no" outflow of decision block 422, to notification 426 of a special intervention, e.g., by appropriate security personnel.

Figure 5:
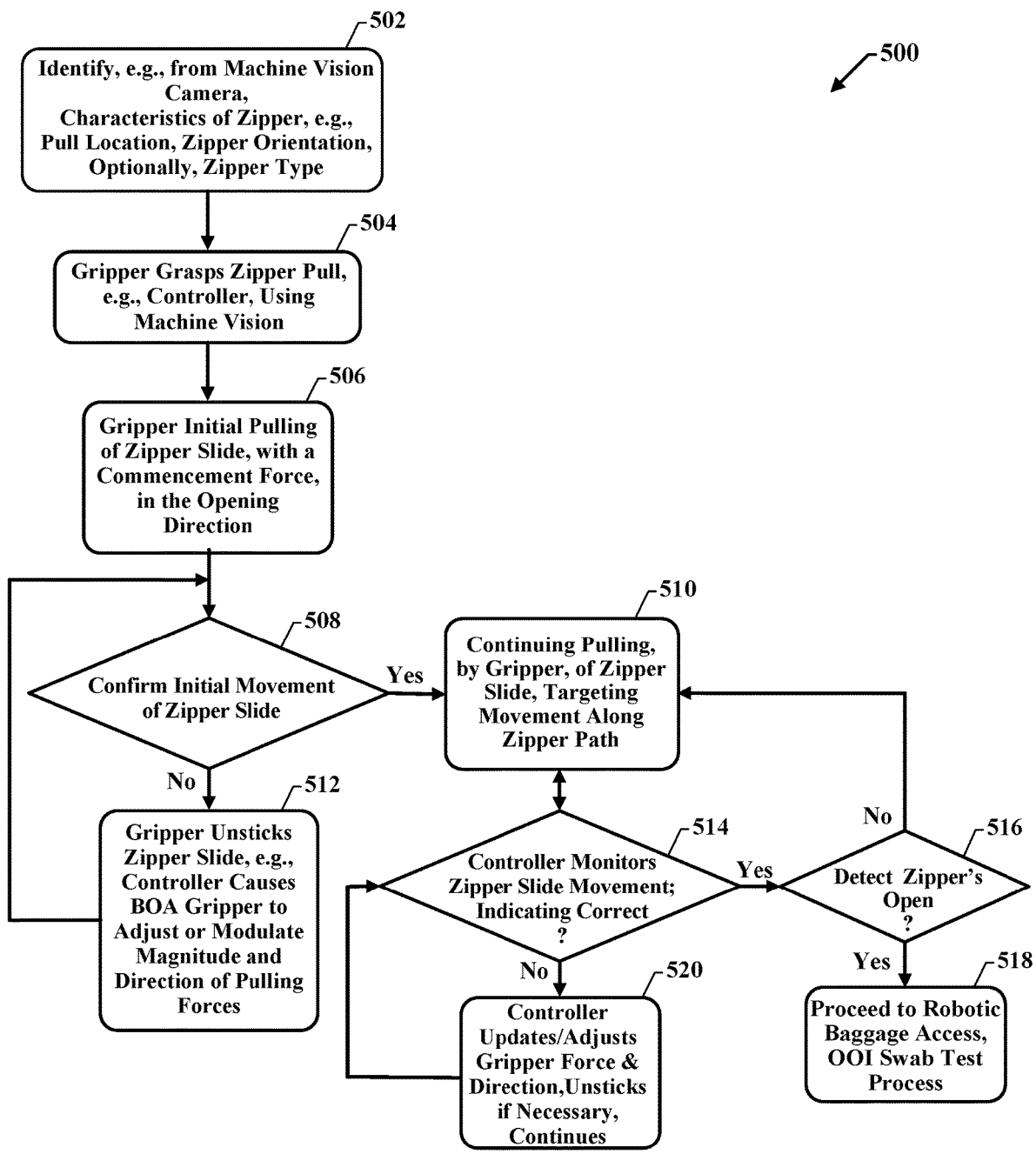
FIG. 5 shows a flow diagram of operations in a robotic process in opening a zipper of a baggage item in a robotic resolution of scan alarms in accordance with various disclosed embodiments.

FIG. 5 shows a flow diagram of operations in one robotic opening process 500 for opening a zipper, in a process of robotic alarm resolution in accordance with this disclosure. Examples of various operations in the robotic opening process 500 are described with references to the FIG. 1 system 100. The references to FIG. 1 are for convenience and to focus description on process and flow aspects, without potential of obfuscation through detailed description of another environment. The references are not to be understood as a limiting of practices according to this disclosure to the embodiment shown in FIG. 1.

An iteration through the robotic opening process 500 will be described. The description assumes a subject baggage item 104 containing one or more OOIs has been scanned by the X-ray scanner 102, the scan analyzer 108 performed image reconstruction from the corresponding scan data, the scan interpreter 109 detected from the image reconstruction, or the scan data, or both, likely presence of the OOIs, and generated an alarm. Description assumes the alarm-switched path baggage transport 128, in response to the alarm, temporarily switched from the first path 130 to the second path 132, transporting the subject baggage item 104 to the robotic baggage item opening and inspection apparatus 110. Description also assumes that robotic arm and gripper operations in the process are performed by the first articulated robotic arm 112 and first gripper 118, under control of the robotic controller 116, using the first machine vision camera 122.

The robotic opening process 500 can be implemented, for example, by the robotic controller 116 generating and feeding a sequence of robotic opening instructions to the first articulated robotic arm 112 and first gripper 118. The sequence of robotic opening instructions can include instructions configured to cause the first articulated robotic arm 112 and first gripper 118, in combination with the robotic controller logic 116 to perform robotic identifying 502 of particular physical characteristics of the zipper of the subject baggage item 104. Operations in the robotic identifying 502 can include, for example, the robotic controller 116 receiving an image of the zipper from the first machine vision camera 122, and then applying to the image an analysis algorithms. The one or more image analysis algorithm can be particularly configured to detect, e.g., by robotic identifying 502, zipper characteristics that may be determinative of specific grasping operations. The image analysis programs may include, for initial identification of the zipper, a convolution neural net (CNN) program, such as, but not limited to, YOLO ("you only look once"), which can be obtained, for example, from GitHub, 88 Colin P Kelly Jr St, San Francisco Calif.

The robotic opening process 500 then proceeds from robotic identifying 502 such zipper characteristics to a robotic grasping 504 by a gripper, e.g., the first gripper 118, of the zipper pull 302. The robotic opening process 500 can then proceed to the gripper applying an initial pulling 506 of the zipper slide 304, via the zipper pull 302, using the above-described initiating or commencement force. Substantially concurrent with the initial pulling 506, the robotic controller 116 can perform a confirming 508 of the requisite initial movement of the zipper slide 304. If the confirming 508 indicates a positive movement, the robotic opening process 500 can proceed to a continuing pulling 510 of the zipper slide 304, e.g., by the first gripper 118. The continuing pulling 510 can apply a pulling force, having a magnitude and a direction, as controlled by the robotic controller 116, that targets movement of the zipper slide 304 to a zipper path, e.g., the FIG. 3B zipper path UZP. In an implementation, the gripper, e.g., the first gripper 118, can include pressure sensors, and the robotic controller 116 can be configured to receive the pressure sensor data and use said data in guiding the continuing pulling 510.

If the confirming 508 does not indicate positive movement, i.e., the zipper slide 304 appears to be stuck, the robotic opening process 500 can proceed to operations by the gripper for unsticking 512 the zipper slide 304. Example operations in the unsticking 512 can include the robotic controller 116 adjusting force magnitude or force direction, or both. Operations in the unsticking 512 can include back and forth movement, parallel the opening direction OPN.

Referring again to the continuing pulling 510, the robotic opening process 500 can include monitoring 514, e.g., by the robotic controller 116, the zipper slide 304 movement. The monitoring 514 can include, for example, the robotic controller 116 receiving image data from the first machine vision camera 122. The monitoring 514 can also receive data from pressure sensors in the first gripper 118.

In an embodiment, the continuing pulling 510 and the monitoring 514 by the robotic controller 116 can continue until detecting 516 that the zipper is open, or the monitoring 514 detecting an undesired event or condition in the zipper slide 304 movement, whichever occurs first. If detecting 516 the zipper being open occurs first, the robotic opening process 500 can proceed 518 to a robotic access and swabbing of the one or more OOIs. An example of a process in a robotic access and swabbing of one or more OOIs is described in further detail in reference to FIG. 6.

If the monitoring 514, e.g., by the robotic controller 116, detects an undesired event or condition in the zipper slide 304, before the detecting 516 that the zipper is open, the robotic opening process 500 can proceed to the robotic controller 116 updating 520 the gripper force, in magnitude, or direction, or both. The updating 520 can include an unsticking process, such as described in reference to the unsticking 512.

Figure 6:
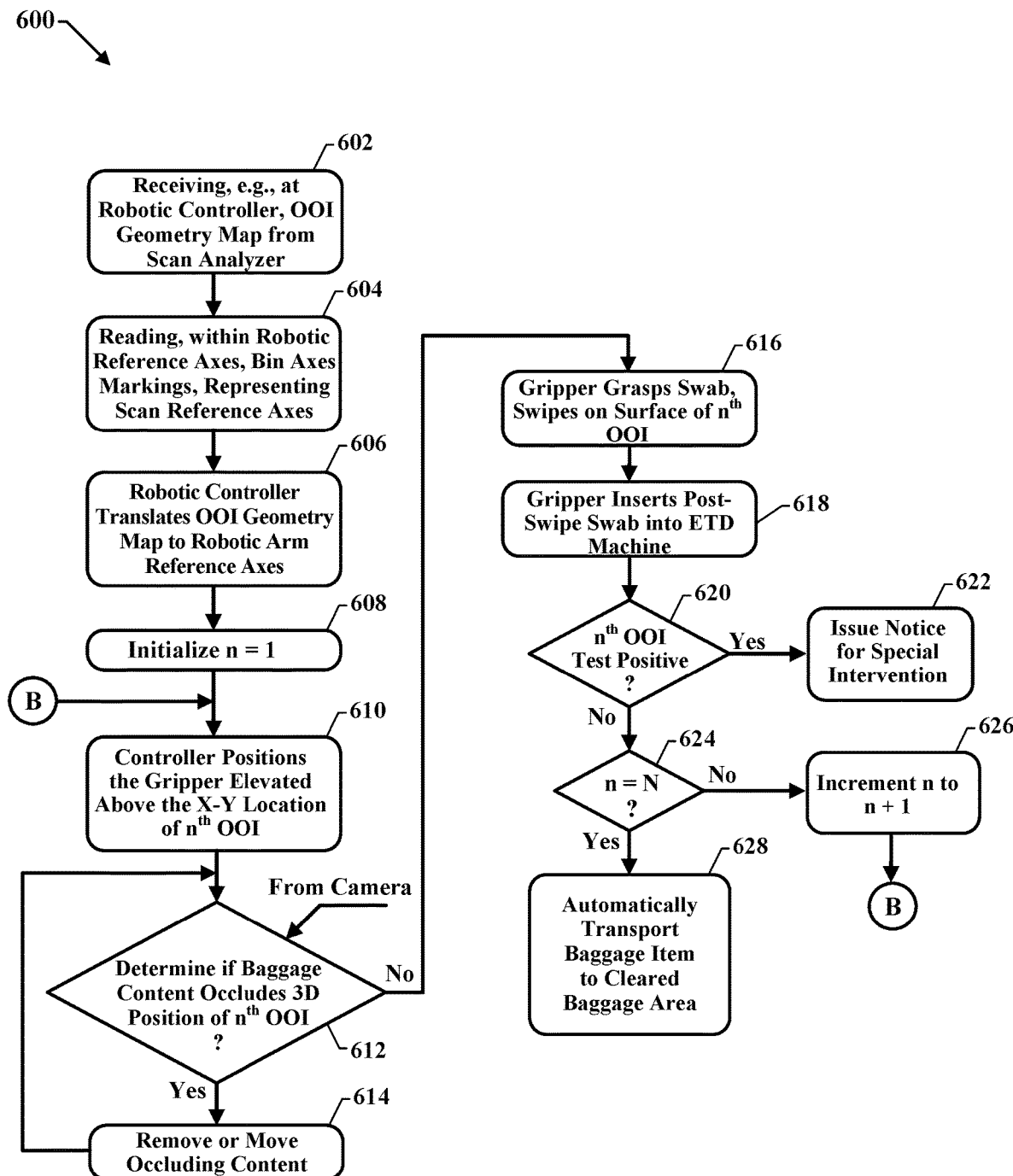
FIG. 6 shows a flow diagram of various operations in a robotic process of accessing and swabbing one or more OOIs in an alarm triggering baggage item, and submitting swabs for explosive trace detection (ETD), in robotic resolution of scan alarms in accordance with various disclosed embodiments.

FIG. 6 shows a flow diagram of operations in a robotic accessing and swabbing process 600 of accessing and swabbing one or more OOIs in an alarm triggering baggage item, such as the above described subject baggage item 104 and submitting the swabs to an ETD. The robotic accessing and swabbing process 600 can be in a robotic resolution of scan alarms in accordance with this disclosure.

The robotic accessing and swabbing process 600 can include a receiving 602, by the robotic controller 116, of an OOI geometry map from the scan analyzer 108. The OOI geometry map indicates the 3D geometric positions of the one or more OOIs in the subject baggage item 104, within the X, Y, Z reference frame established by the PCF baggage transport bin 106 in which the subject baggage item 104 was scanned and transported to the X-ray scanner 102. The robotic accessing and swabbing process 600 then proceeds to a reading 604, within the robotic reference axes X', Y', Z', of the bin 106 visible reference axis markings for X, Y, and Z. The PCF baggage transport bin 106 visible reference axis markings, as described above in reference to FIG. 2, show the spatial reference axes used by the X-ray scanner 102 and the scan analyzer 108 in generating the OOI geometry map for the subject baggage item 104. From the reading 604 the robotic accessing and swabbing process 600 can proceed to determining the orientation of the bin 106 visible reference axis marking for X, Y, and Z relative to the robotic reference axes X', Y', Z', for translating 606, e.g., by the robotic controller 116, of the OOI geometry map to a translated OOI map in the robotic reference axes X', Y', and Z'. The translating 606 can include, based on the determined orientation, a projection or a resolving of the X, Y, Z reference axis markings of bin 106 into the robotic reference axes X', Y', and Z' From the translating 606, the robotic accessing and swabbing process 600 can proceed to initializing 608 an iteration counter of n to n=1.

The robotic accessing and swabbing process 600 can proceed from the initializing 608 to a positioning 610 of the gripper, e.g., the gripper 218 or the FIG. 1 second gripper 120, to a position above the X'-Y' location of the $n^{th}$ OOI. From the elevated position, the robotic accessing and swabbing process 600 can determine 612 whether the $n^{th}$ OOI appears exposed or appears occluded by a baggage content. The determining 612 can be performed, for example, by the robotic controller 116, using the second machine vision camera 124 to view an interior of the baggage item 104. If the determining 612 is that the $n^{th}$ OOI appears occluded by a baggage content, for example, an overlaying content, the robotic accessing and swabbing process 600 can proceed to a content moving 614 operation. The content moving 614 can include grasping, lifting, and repositioning of the overlaying content, for example, by the gripper 218 in combination with movements of the articulated robotic alarm. The grasping, lifting, and repositioning operations in the content moving 614 can include a task limit logic, which can be configured as a time duration limit, an iteration limit, or both. In an aspect, the robotic process 600 can include in the content moving operation 614 a task termination or escape procedure should the content moving 614 exceed the task limit. In various embodiments, the task termination or escape procedure can include, for example, a generation of an alert for a manual intervention. Embodiments can include an adaptation of the alarm-switched baggage conveyor 128 that, in response to the above-described task termination or escape, can convey the subject baggage item to another location, e.g., for disposal.

Upon the $n^{th}$ OOI appearing visible, e.g., prior to exceeding the above-described task limit, the robotic accessing and swabbing process 600 can proceed to causing the gripper, e.g., the second gripper 120, swiping 616 a swab on an exterior surface of the $n^{th}$ OOI. Upon completion of the gripper swiping 616 the swab on an exterior surface of the $n^{th}$ OOI, the robotic accessing and swabbing process 600 can proceed to the gripper inserting 618 the swab into an ETD machine, e.g., the FIG. 1 ETD device 126. If the ETD machine returns at 620 a positive result, the robotic accessing and swabbing process 600 can proceed to issuing 622 a notice for special intervention. If the ETD machine returns at 620 a negative result. the robotic accessing and swabbing process 600 can proceed to determine 624 whether the swipe counter index n is equal to N. In other words, the process determination 624 determines whether there are any not-yet-swiped OOIs on the OOI map. If the determination 624 is "No," i.e., there are not-yet-swiped OOIs on the OOI map, the robotic accessing and swabbing process 600 can proceed to incrementing 626 the loop counter n by integer 1, then to positioning 610 of the gripper, e.g., the gripper 218 or the FIG. 1 second gripper 120, to a position above the X'-Y' location of $n+1^{th}$ OOI.

If the determination 624 is "Yes," the swipe counter index n is equal to N, none of the N OOIs produced a positive swab result. Accordingly, the robotic accessing and swabbing process 600 can proceed to transporting 628 the subject baggage item 104 to the cleared baggage pick-up area CBA.

Figure 7:
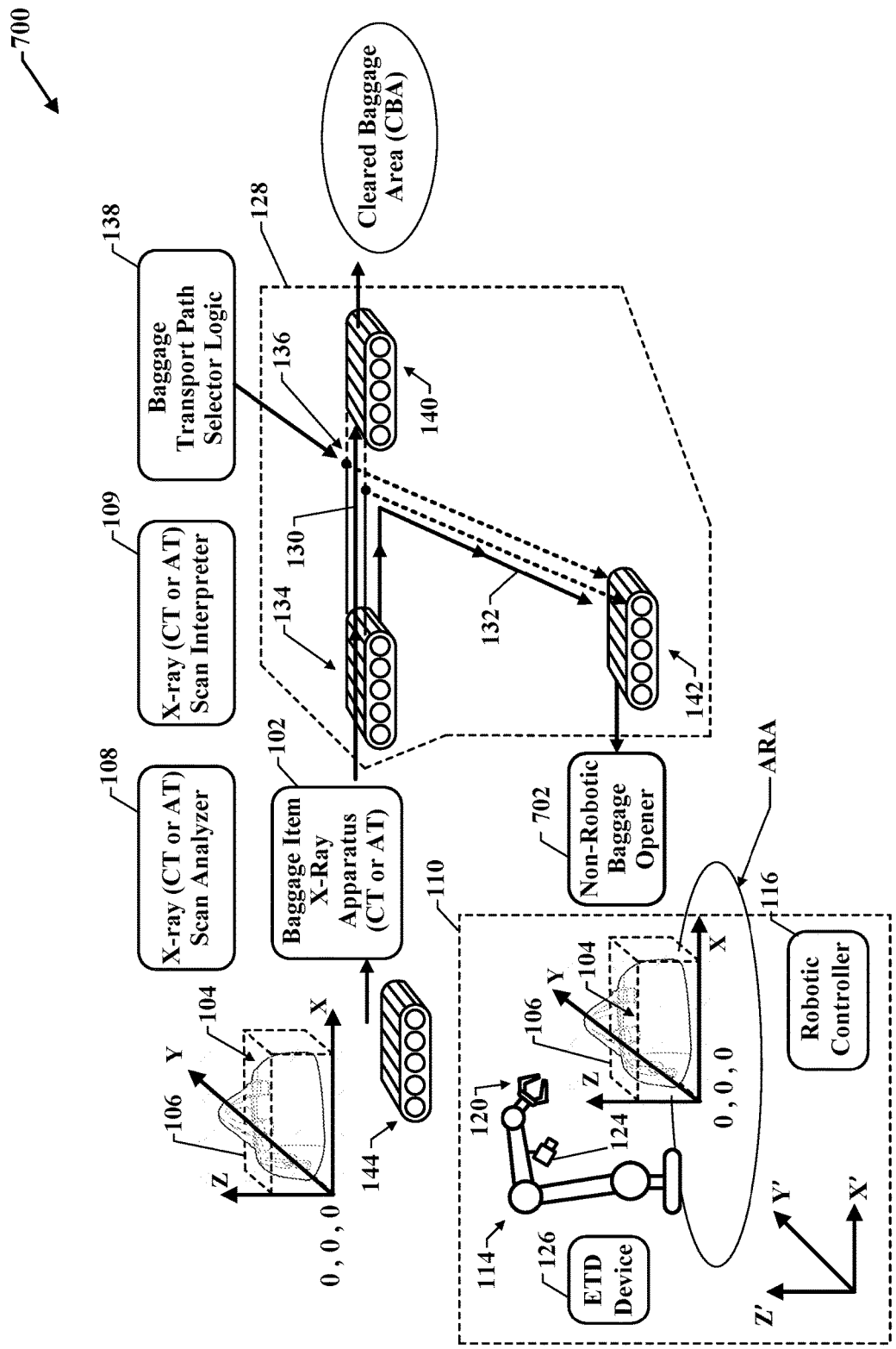
FIG. 7 shows a functional block diagram of a further embodiment of a system for robotic resolution of baggage scanning alarm in accordance with various disclosed embodiments.

FIG. 7 shows a functional block diagram of one alternative embodiment 700 of a system (hereinafter "system 700") for robotic resolution of baggage scanning alarm in accordance with this disclosure. The system 700 is shown as a modification of the system 100, which supplements the first articulated robotic arm 112 with a non-robotic baggage item opener attendant 702, e.g., a security personnel.

Computer System

Figure 8:
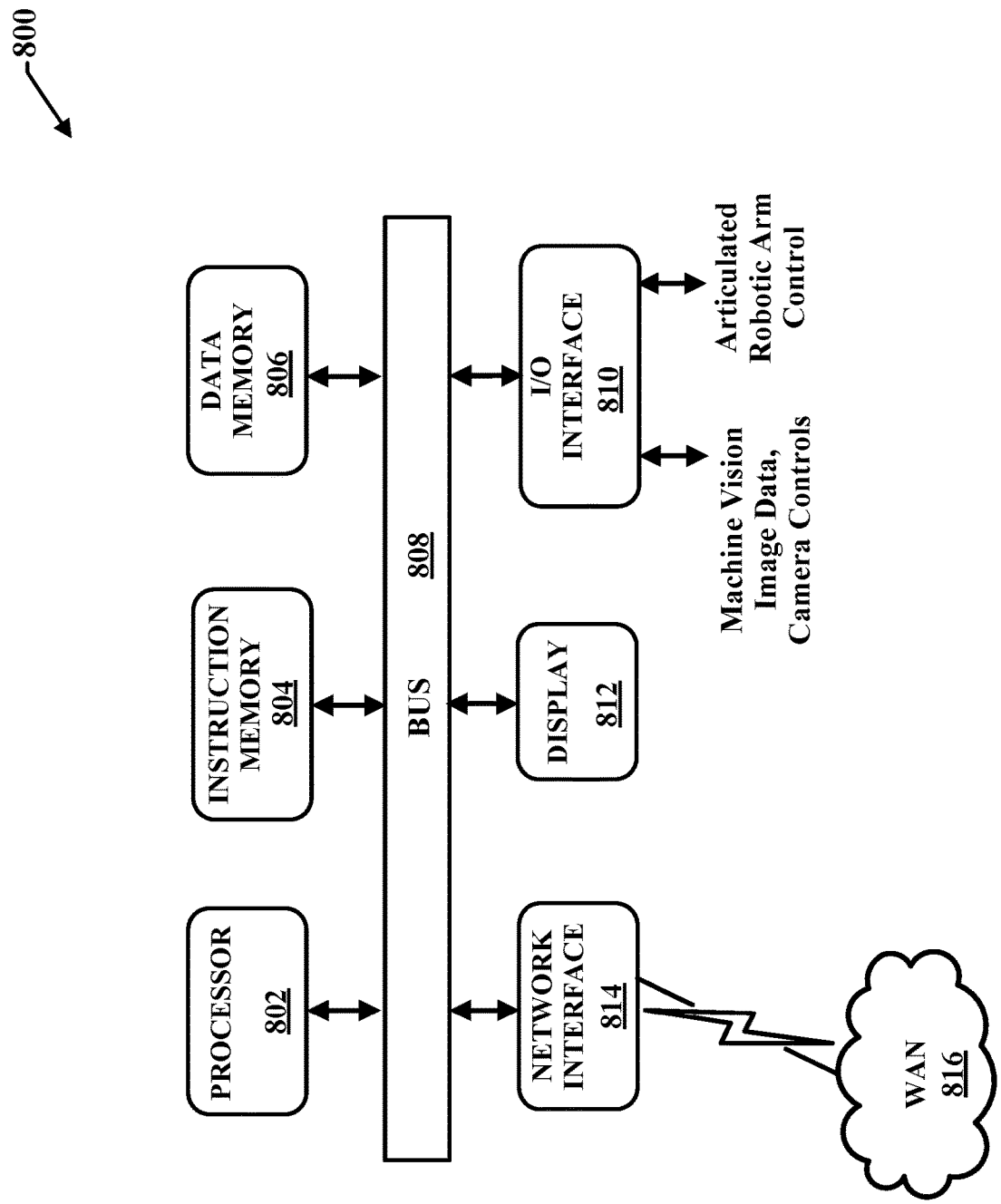
FIG. 8 illustrates, in simplified schematic form, a computing system on which aspects of the present disclosure can be practiced.

FIG. 8 illustrates, in simplified schematic form, a computing system 800 on which aspects of the present disclosure can be practiced. The computer system 800 can include a hardware processor 802 communicatively coupled to an instruction memory 804 and to a data memory 806 by a bus 808. The instruction memory 804 can be configured to store, on at least a non-transitory computer readable medium as described in further detail below, executable program code 810. The hardware processor 802 may include multiple hardware processors and/or multiple processor cores. The hardware processor 802 may include hardware processors from different devices, that cooperate. The computer system 800 system may execute one or more basic instructions included in the executable program code 810.

Relationship Between Hardware Processor and Executable Program Code

The relationship between the executable program code 810 and the hardware processor 802 is structural; the executable program code 810 is provided to the hardware processor 802 by imparting various voltages at certain times across certain electrical connections, in accordance with binary values in the executable program code 810, to cause the hardware processor to perform some action, as now explained in more detail.

A hardware processor 802 may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONCLUSION

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

What is claimed:

1. A robotic baggage item opening and inspection apparatus, comprising:
    a plurality of articulated robotic arms including a first articulated robotic arm configured to open baggage items and a second articulated robotic arm configured to swab surfaces of Objects Of Interest (OOIs); and
    a robotic controller, connected to the plurality of articulated robotic arms, configured to control the plurality of articulated robotic arms;
    the robotic baggage item opening and inspection apparatus configured to perform, responsive to receiving a baggage item and a transport bin including a spatial reference frame marking in combination with an object-of-interest (OOI) geometric position information, indicating a geometric position of an OOI, relative to the spatial reference frame marking:
        a robotic opening operation to the baggage item, and upon a positive result of the robotic opening operation, to perform:
            a robotic accessing and swabbing operation directed to the OOI, based at least in part on a combination of the OOI geometric position information and a machine vision detection of the spatial reference frame marking.

2. The robotic baggage item opening and inspection apparatus of claim 1, wherein:
    the robotic controller is configured to control the plurality of articulated robotic arms based at least in part on a translating the OOI geometric position information to a translated OOI geometric position map, the translating being based at least in part on the machine vision detection of an orientation of the spatial reference frame marking relative to a local spatial reference frame, which is local to the robotic baggage item opening and inspection apparatus.

3. The robotic baggage item opening and inspection apparatus of claim 2, further comprising:
    the robotic controller being further configured to perform the robotic opening operation with a configuration for opening a zipper of the baggage item;
    a machine vision camera, communicatively coupled to the robotic controller, and configured to generate an image of the zipper;
    the first articulated robotic arm being configured to include a gripper with structure particularized to opening one or more types of baggage item open-close mechanisms; and
    the robotic controller being configured to receive the image of the zipper, identify from the image of the zipper a zipper slide and a zipper pull, and in response, to cause the gripper to apply a pulling force to the zipper slide, in an opening direction of the zipper, using the zipper pull.

4. The robotic baggage item opening and inspection apparatus of claim 3, further comprising:
    the robotic controller being further configured to perform, based at least in part on the image from the machine vision camera, a confirming of a positive movement of the zipper slide in response the pulling force, and in response to the confirming not indicating the positive movement, to cause the gripper to apply an unsticking, the unsticking including a back and forth movement, parallel the opening direction of the zipper.

5. The robotic baggage item opening and inspection apparatus of claim 2, further comprising:
    the first articulated robotic arm being configured to include a first gripper with structure particularized to opening one or more types of baggage item open-close mechanisms;
    the second articulated robotic arm being configured to include a second gripper with structure particularized to swabbing surfaces of OOIs;
    the robotic controller being further configured to perform the robotic opening operation with a configuration for opening a zipper of the baggage item;
    a machine vision camera, communicatively coupled to the robotic controller, and configured to generate an image, upon a completion of the robotic opening of the baggage item and during the robotic accessing and swabbing operation, of an interior of the baggage item; and
    the robotic controller being further configured to control the plurality of articulated robotic arms, in the robotic accessing and swabbing operation, to:
        initially position at least one of the first gripper and the second gripper, based at least in part on the translating the OOI geometric position information to the translated OOI geometric position map, to an elevated position, the elevated position being elevated above and aligned with the OOI, and
        determine, based at least in part on the image, whether the OOI appears exposed or appears occluded by an overlaying content and, responsive to determining that the OOI appears occluded by the overlaying content, to perform a robotic moving of the overlaying content.

6. The robotic baggage item opening and inspection apparatus of claim 5, further comprising:
    monitoring the robotic moving of the overlaying content for exceeding a task limit and, in response to detecting the exceeding the task limit, to perform a task termination or escape procedure.

7. The robotic baggage item opening and inspection apparatus of claim 2, further comprising:
the spatial reference frame marking including a first reference axis marking, a second reference axis marking, and a third reference axis marking, the first reference axis marking extending parallel to a first reference axis, the second reference axis marking extending parallel to a second reference axis, the second reference axis being orthogonal to the first reference axis, and the third reference axis marking extending parallel to a third reference axis, the third reference axis being orthogonal to the first reference axis and orthogonal to the second reference axis;
a scan analyzer, configured to receive a scan data output from an electromagnetic scanning and, based at least in part on the scan data output, to generate the OOI geometric position information as an OOI map, the OOI map including a geometric position of an OOI, in terms of a first reference axis position, a second reference axis position, and a third reference axis position;
the local spatial reference frame being configured to include a first local reference axis, a second local reference axis, and a third local reference axis, the second local reference axis being orthogonal to the first local reference axis, and the third local reference axis being orthogonal to the first local reference axis and orthogonal to the second local reference axis; and
the robotic controller being further configured to further control the plurality of articulated robotic arms, in the robotic accessing and swabbing operation, based at least in part on a mapping of the first reference axis position to a position on the first local reference axis, a mapping of the second reference axis position to a position on the second local reference axis, and a mapping of the third reference axis position to a position on the third local reference axis.

8. The robotic baggage item opening and inspection apparatus of claim 2, further comprising:
the robotic controller being further configured to control the second articulated robotic arm to perform a swabbing operation on the OOI.

9. The robotic baggage item opening and inspection apparatus of claim 1, further comprising:
the robotic baggage item opening and inspection apparatus being arranged at a first area and configured to interface with an alarm switched baggage conveyor; and
the robotic baggage item opening and inspection apparatus being configured to, in response to an indicator of a detection by electromagnetic scanning of the OOI within the baggage item, signal the alarm switched baggage conveyor to convey the transport bin to a second area, different from the first area.

10. The robotic baggage item opening and inspection apparatus of claim 1, wherein the robotic accessing and swabbing operation further comprises:
a swabbing operation on a plurality of OOIs using a swab; and
insertion of the swab to an explosive trace detection (ETD) system.

11. The robotic baggage item opening and inspection apparatus of claim 1, wherein the robotic accessing and swabbing operation further comprises:
a swabbing operation on the OOI using a swab; and
upon a determination that there are no not-yet-swiped OOIs, insertion of the swab to an explosive trace detection (ETD) system.

12. A method for robotic arm resolution of baggage scanning alarm generated by electromagnetic scanner, comprising:
receiving, from an electromagnetic scanning:
a baggage item and an object-of-interest (OOI) geometric position information indicating a detected geometric position, by the electromagnetic scanning, of an object-of-interest (OOI) in reference to a spatial reference frame marking corresponding to a machine readable marking of a spatial reference frame; and
in response to the receiving:
applying a robotic opening operation to the baggage item, the robotic opening operation being configured for opening a zipper of the baggage item, and being further configured to include:
identifying, from machine vision imaging of the zipper, a zipper slide and a zipper pull, and
applying, by a first gripper of a first articulated robotic arm configured to open baggage items, a pulling force to the zipper slide, in an opening direction of the zipper, using the zipper pull, and
upon a positive result of the robotic opening operation:
performing, by a second gripper of a second articulated robotic arm configured to swab surfaces of Objects Of Interest (OOIs), a robotic accessing and swabbing operation directed to the OOI.

13. The method of claim 12 for robotic arm resolution of baggage scanning alarm, further comprising:
receiving, from the electromagnetic scanning, the baggage item carried in a transport bin that includes the spatial reference frame marking corresponding to the machine readable marking of the spatial reference frame; and
in response to the receiving:
machine vision detecting of the spatial reference frame marking,
resolving the spatial reference frame marking into a local spatial reference frame, the local spatial reference frame being local to the robotic accessing and swabbing operation,
translating the OOI geometric position information to a local OOI geometric position map, based at least in part on a result of the resolving, and
performing the robotic accessing and swabbing operation directed to the OOI, based at least in part on the local OOI geometric position map.

14. The method of claim 12 for robotic arm resolution of baggage scanning alarm, further comprising:
confirming, from a continuing of the machine vision imaging of the zipper, a positive movement of the zipper slide in response the pulling force, and in response to the confirming not indicating the positive movement, applying by the first gripper an unsticking, the unsticking including a back and forth movement, parallel the opening direction of the zipper.

15. The method of claim 13 for robotic arm resolution of baggage scanning alarm, further comprising:
the robotic accessing and swabbing operation including:
obtaining, upon a completion of the robotic opening operation, a machine vision imaging of an interior of the baggage item,
initially positioning at least one of the first gripper or the second gripper, based at least in part on the local OOI geometric position map, to an elevated position, the elevated position being elevated above and aligned with the OOI, and determining, based at least in part on the machine vision imaging of the interior of the baggage item, whether the OOI appears exposed or appears occluded by an overlaying content and, responsive to determining that the OOI appears occluded by the overlaying content, performing a robotic moving of the overlaying content.

16. The method of claim 15 for robotic arm resolution of baggage scanning alarm, further comprising:

monitoring the robotic moving of the overlaying content for exceeding a task limit and, in response to detecting the exceeding the task limit, to perform a task termination or escape procedure.

17. The method of claim 12 for robotic arm resolution of baggage scanning alarm, further comprising:

the spatial reference frame marking including a first reference axis marking, a second reference axis marking, and a third reference axis marking, the first reference axis marking extending parallel to a first reference axis, the second reference axis marking extending parallel to a second reference axis, the second reference axis being orthogonal to the first reference axis, and the third reference axis marking extending parallel to a third reference axis, the third reference axis being orthogonal to the first reference axis and orthogonal to the second reference axis; and analyzing a scan data output from the electromagnetic scanning and, based at least in part on the scan data output, generating the OOI geometric position information as an OOI map, the OOI map including a position of the OOI in terms of a first reference axis position, a second reference axis position, and a third reference axis position.

18. The method of claim 12 for robotic arm resolution of baggage scanning alarm, wherein performing the robotic accessing and swabbing operation comprises:

performing, by the second gripper, a swabbing operation on the OOI using a swab; and inserting the swab to an explosive trace detection (ETD) system.

19. The method of claim 12 for robotic arm resolution of baggage scanning alarm, wherein performing the robotic accessing and swabbing operation comprises:

performing, by the second gripper, a swabbing operation on a plurality of OOIs using a swab; and upon determining that there are no not-yet-swiped OOIs, inserting the swab to an explosive trace detection (ETD) system.

20. A system for robotic arm resolution of baggage scanning alarm generated by electromagnetic scanner, comprising:

a transport bin, configured for carrying a baggage item, including a spatial reference frame marking disposed on the transport bin, the spatial reference frame marking being detectable by electromagnetic scanning and by machine vision, and including:

a first reference axis marking, a second reference axis marking, and a third reference axis marking, the first reference axis marking extending parallel to a first reference axis, the second reference axis marking extending parallel to a second reference axis, the second reference axis being orthogonal to the first reference axis, and the third reference axis marking extending parallel to a third reference axis, the third reference axis being orthogonal to the first reference axis and orthogonal to the second reference axis; and a robotic baggage item opening and inspection apparatus, comprising a robotic controller and a plurality of articulated robotic arms including a first articulated robotic arm configured to open baggage items and a second articulated robotic arm configured to swab surfaces of Objects Of Interest (OOIs); the robotic controller being connected to the plurality of articulated robotic arms and configured to control the plurality of articulated robotic arms.

* * * * *